(12) United States Patent
Weng

(10) Patent No.: US 6,241,155 B1
(45) Date of Patent: Jun. 5, 2001

(54) AUTOMATIC ADJUSTING CONTROL SYSTEM FOR AIR-CONDITIONER

(75) Inventor: Kuo-Liang Weng, Taichung (TW)

(73) Assignee: Yiue Feng Enterprise Co., Ltd., Taichung Hsien (TW)

( * ) Notice: Subject to any disclaimer, the term of this patent is extended or adjusted under 35 U.S.C. 154(b) by 0 days.

(21) Appl. No.: 09/249,819

(22) Filed: Feb. 16, 1999

(51) Int. Cl.⁷ .............................. G05D 23/00; F24F 3/00
(52) U.S. Cl. .............................. 236/47; 236/51; 307/39; 165/209
(58) Field of Search .................. 236/51, 47; 165/209, 165/208, 205; 307/39

(56) References Cited

U.S. PATENT DOCUMENTS 4,223,831 * 9/1980 Szarka .................................... 236/47
5,495,722 * 3/1996 Manson et al. ..................... 236/51 X

* cited by examiner

*Primary Examiner*—William Wayner
(74) *Attorney, Agent, or Firm*—Rosenberg, Klein & Lee

(57) ABSTRACT

The present invention relates an automatic adjusting control system which is able to automatically adjust an operation setting value thereof according to the air-conditioning environmental conditions and the changes of load or the requirements of users. The control system mainly includes a plurality of air-conditioners, a plurality of sensors, a central control unit which is able to compare the operation setting value with values detected by each of the sensors to produce a mating signal, and a plurality of control boxes being able to control the operation of each of the air-conditioners according to the mating signal supplied from the central control unit so as to adjust the air-conditioning effect and to save energy.

6 Claims, 12 Drawing Sheets

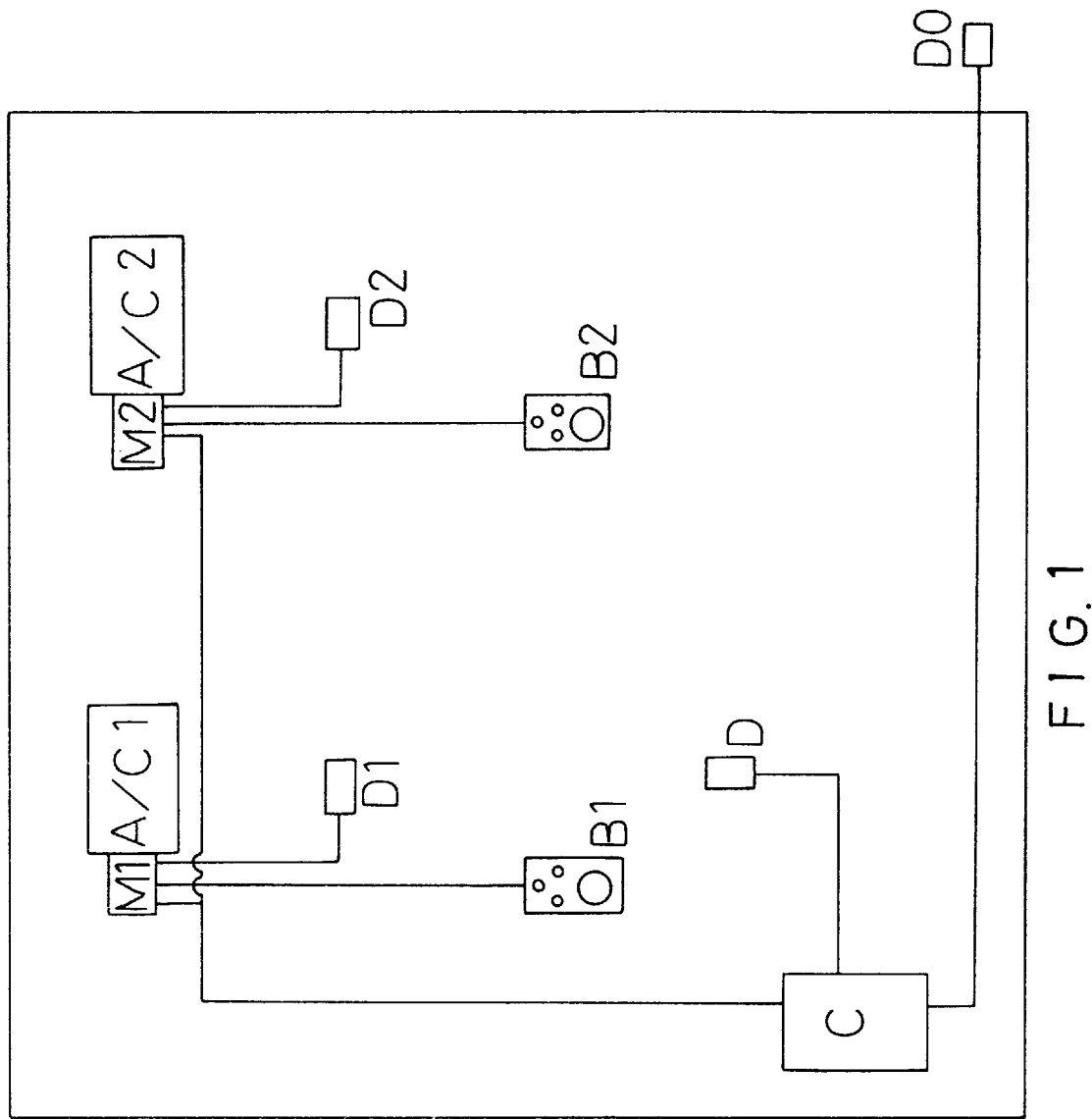
F I G. 1

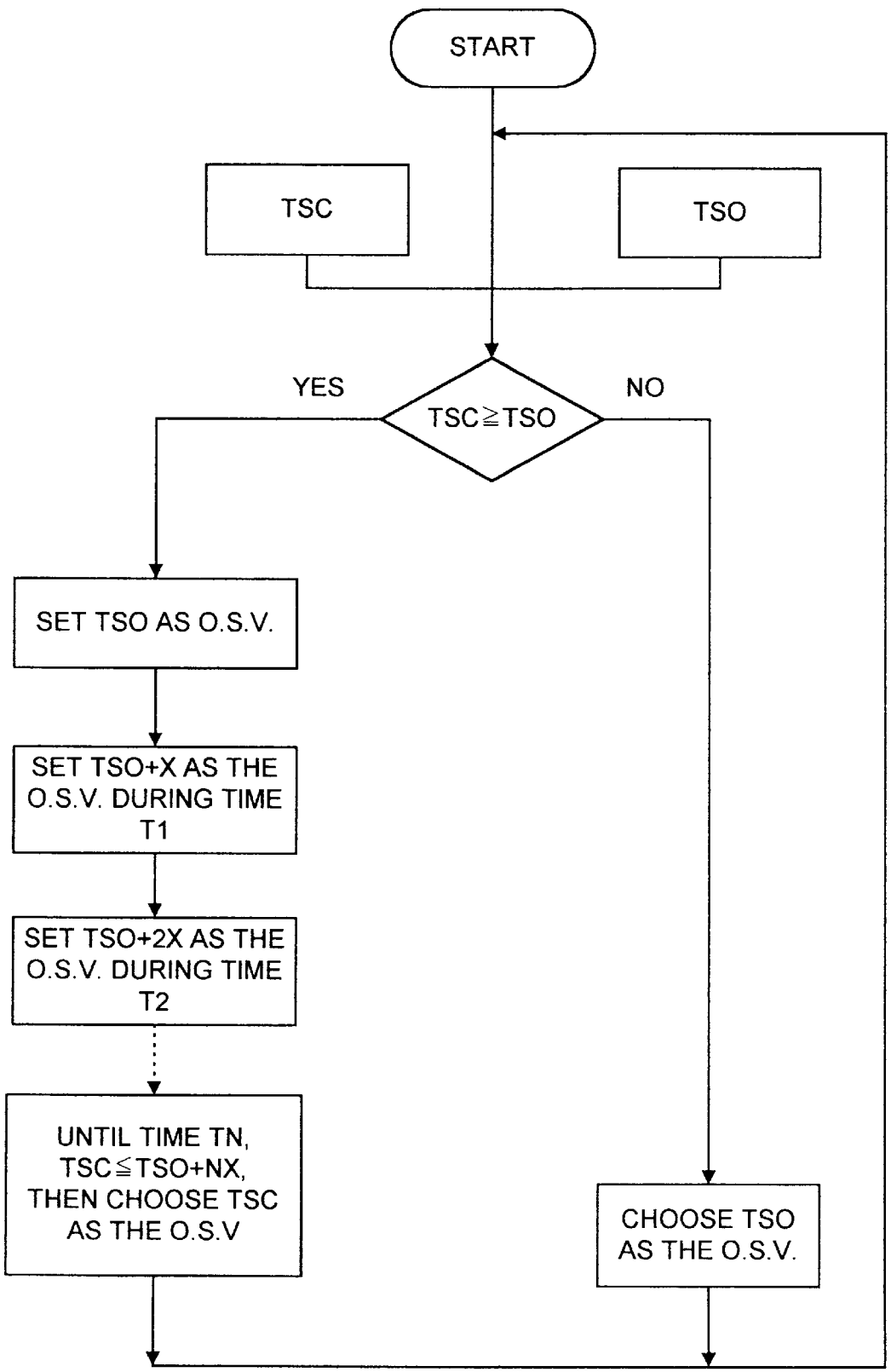
F I G . 4

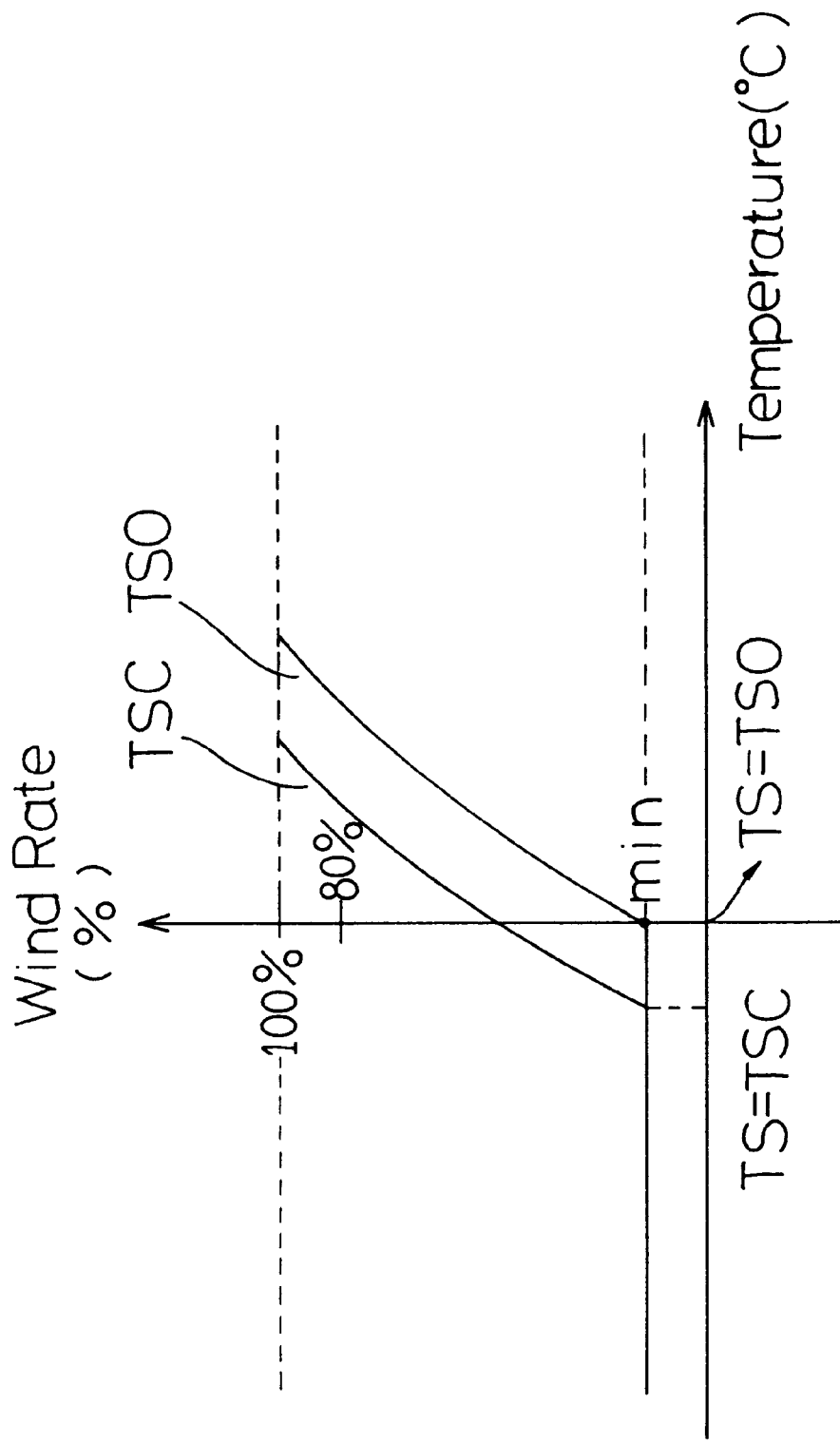
F I G. 11

AUTOMATIC ADJUSTING CONTROL SYSTEM FOR AIR-CONDITIONER

BACKGROUND OF THE INVENTION

1. Field of the Invention

The present invention relates to an automatic adjusting control system for an air-conditioner.

2. Description of the Related Prior Art

A conventional air-conditioner can be used to provide a moderate situation so as to make users feel comfortable in the summer. However, the air-conditioning effect supplied by the conventional air-conditioner will remain the temperature of the room at a fixed temperature which is much greater or much lower than the normal temperature such that persons staying in the room will feel too hot or too cold, thereby easily making them feel uncomfortable, and thereby greatly causing an energy consumption. The present invention has arisen to overcome the disadvantage of the conventional air-conditioner.

SUMMARY OF THE INVENTION

The primary objective of the present invention is to provide an automatic adjusting control system adapted to automatically adjust an operation setting value thereof according to the air-conditioning environmental conditions and the changes of load or the requirements of users.

The control system comprises a plurality of air-conditioners, a plurality of sensors, a central control unit which is able to compare the operation setting value with values detected by each of the sensors to produce a mating signal, and a plurality of control boxes each attached to a respective one of the air-conditioners, each of the control boxes being able to control the operation of each of the air-conditioners according to the mating signal supplied from the central control unit so as to adjust the air-conditioning effect and to save energy.

The control system can be used to prevent the electricity of a building from overloading, and can be used to co-operate with a foreign power supply management unit to control the operation of the air-conditioners, thereby efficiently adjusting the electric load of the building.

The control system can be operated by a special person so as to achieve the purpose of saving energy, and can be connected to and managed by a computer which calculates the total electricity consumption of all of the users to control the operation of the air-conditioners, thereby achieving the optimal operation of the control system.

Further objectives and advantages of the present invention will become apparent after a careful reading of the detailed description with reference to the accompanying drawings.

BRIEF DESCRIPTION OF THE DRAWINGS

FIG. 1 is a schematic view of a control system according to the present invention;

FIG. 4 is a flow chart of the control system according to a third embodiment of the present invention;

FIG. 11 is a graph of wind rate versus temperature according to the first embodiment of the present invention.

DETAILED DESCRIPTION OF THE PREFERRED EMBODIMENTS

With reference to FIG. 1, an automatic adjusting control system according to the present invention comprises a central control unit C, a plurality of air-conditioners A/C1, A/C2, . . . , a plurality of control boxes M1, M2, . . . , each attached to a respective one of the air-conditioners A/C1, A/C2, . . . , a plurality of control panels B1, B2, . . . , each having a setting unit (not shown) mounted therein, a plurality of sensors D1, D2, . . . , a sensor D for detecting the temperature of the standard sensing zone in the air-conditioning room, and a sensor D0 for detecting the temperature of the ambient environment.

Figure 2:
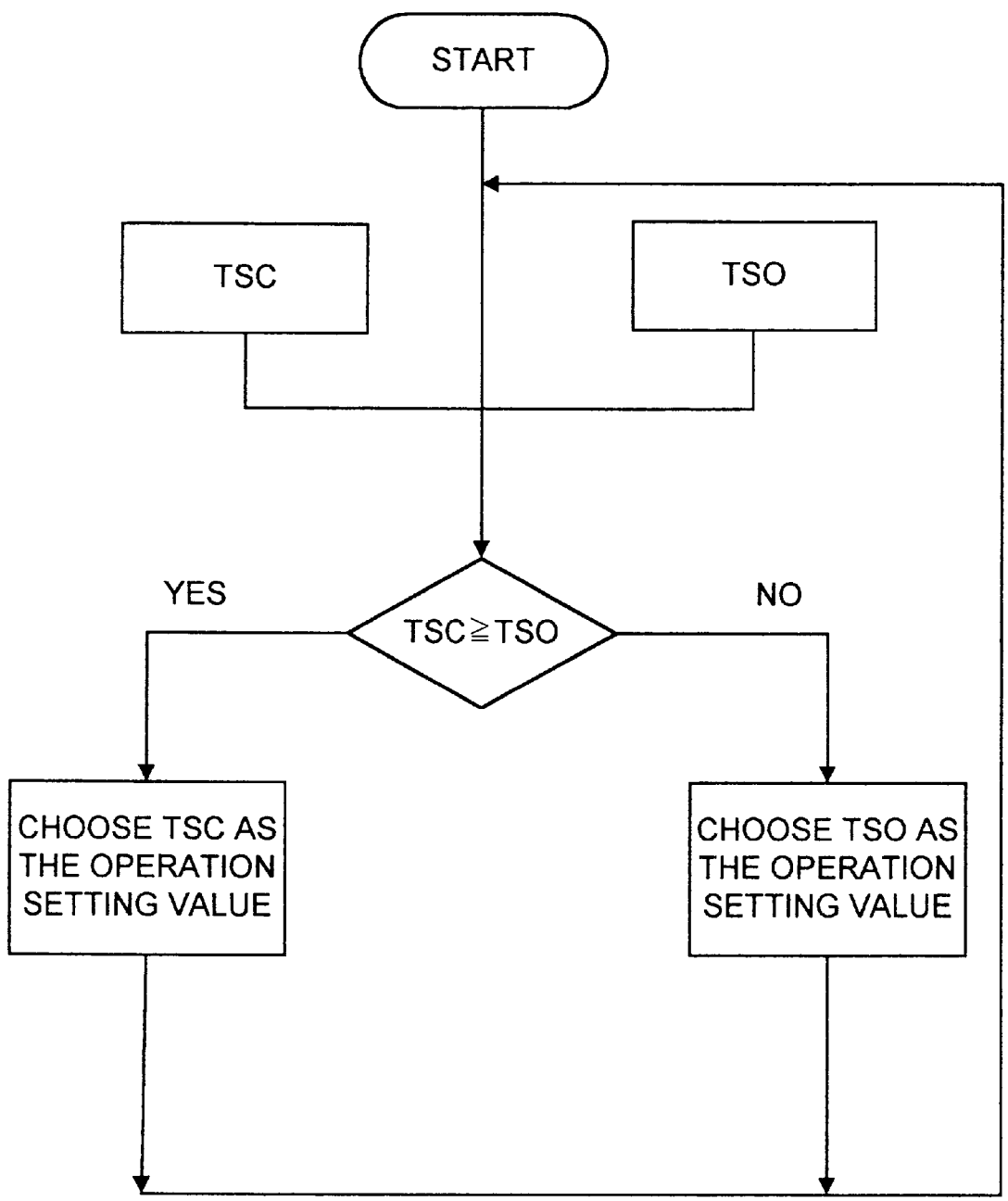
FIG. 2 is a flow chart of the control system according to a first embodiment of the present invention.

With reference to FIG. 2, according to a first embodiment of the present invention, the standard temperature set value TSC of the control system is set to an ideal value which can be input into the central control unit C, and the temperature set value of each of the air-conditioners A/C1, A/C2, . . . , is indicated by TS0, wherein the temperature set values TS0 in the air-conditioners A/C1, A/C2, . . . , are different from each other due to the requirements of different users.

When TSC≧TS0, the control system will choose the value of TSC as the operating setting value TS. Accordingly, the value of TSC is compared with the temperature values TA0 detected by each of the sensors D1, D2, . . . , and each of the control boxes M1, M2, . . . , can be used to control the operation of each of the air-conditioners A/C1, A/C2, . . . , according to the comparison results. When TSC<TS0, the control system will choose the value of TS0 as the operating setting value TS. In such a manner, it is able to choose a proper operating setting value TS so as to prevent the operator from operating or setting the air-conditioner improperly, thereby saving the energy.

Figure 3:
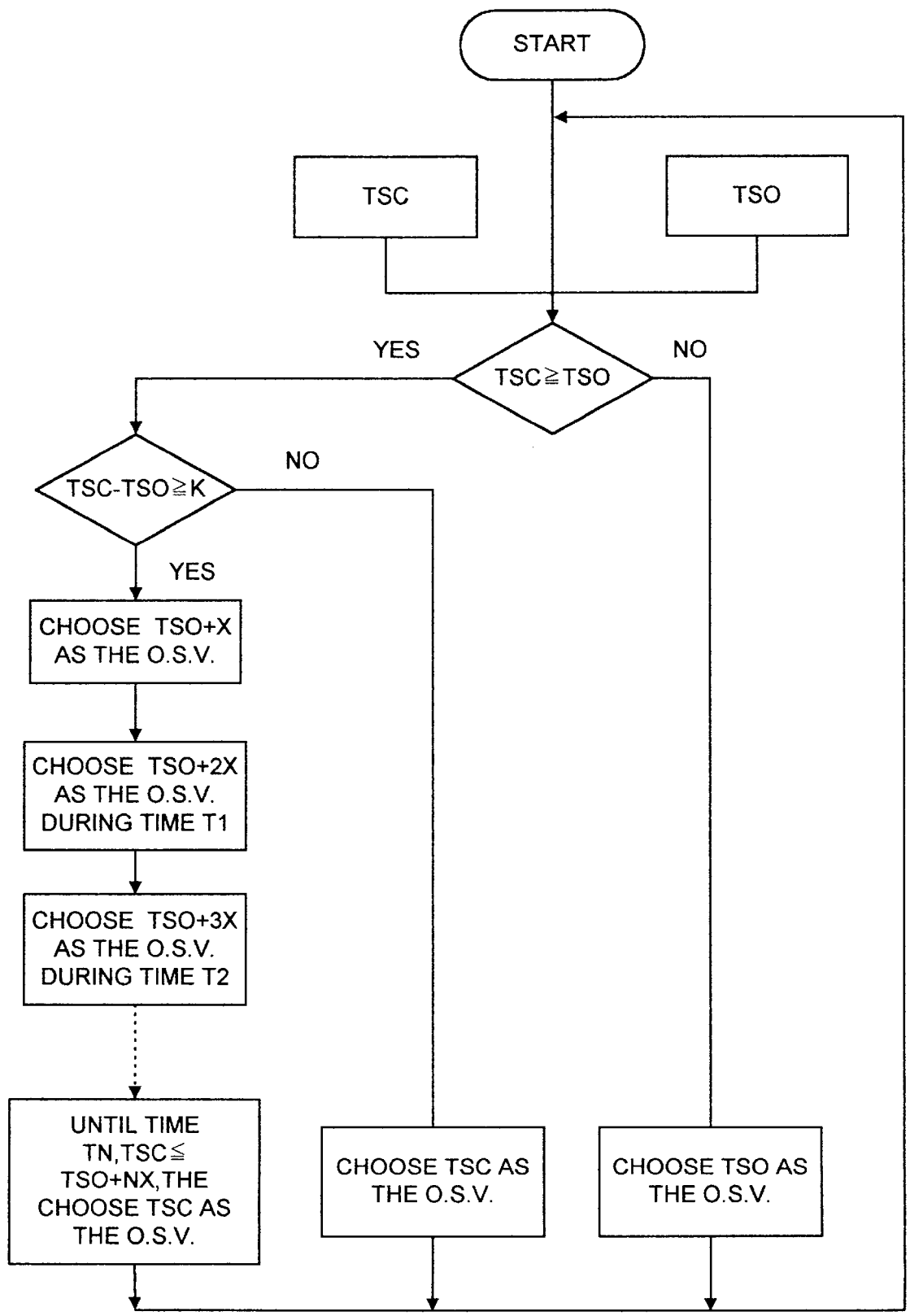
FIG. 3 is a flow chart of the control system according to a second embodiment of the present invention.

With reference to FIG. 3, according to a second embodiment of the present invention, when TSC≧TS0, if the difference between TSC and TS0 is too great, the energy change of the air-conditioners A/C1, A/C2, . . . , will be too great when TSC is chosen as the operating setting value TS. Accordingly, when TSC≧TS0, and TSC−TS0≧K, TS0+X is chosen as the operating setting value TS, TS0+2X is chosen as the operating setting value TS during a period of time T1, TS0+3X is chosen as the operating setting value TS during a period of time T2. The above procedure is repeated until TSC≦TS0+NX, then TSC is chosen as the operating setting value TS. When TSC−TS0<K, it indicates that the difference value K between TSC and TS0 is not too great, then TSC is chosen as the operating setting value TS. When TSC<TS0, TS0 is chosen as the operating setting value TS. In such a manner, the change of temperature in the air-conditioning room will not be too great.

With reference to FIG. 4, according to a third embodiment of the present invention, when TSC≧TS0, the operating setting value TS is forced to be set as TS0 according to the requirement of the operator. Then, the operating setting value TS is in turn adjusted to TS0+X, TS0+2X, TS0+3X, . . . , until TS0+NX, during a period of time T1, T2, T3, . . . , until TN. When TSC≦TS0+NX, then TSC is chosen as the operating setting value TS. When TSC<TS0, TS0 is chosen as the operating setting value TS. In such a manner, the operator can choose TS0 as the operating setting value TS so as to satisfy his requirement during a short period of time, and TSC will be chosen as the operating setting value TS during a proper period of time so as to return to the normal control state of the control system.

Figure 9:
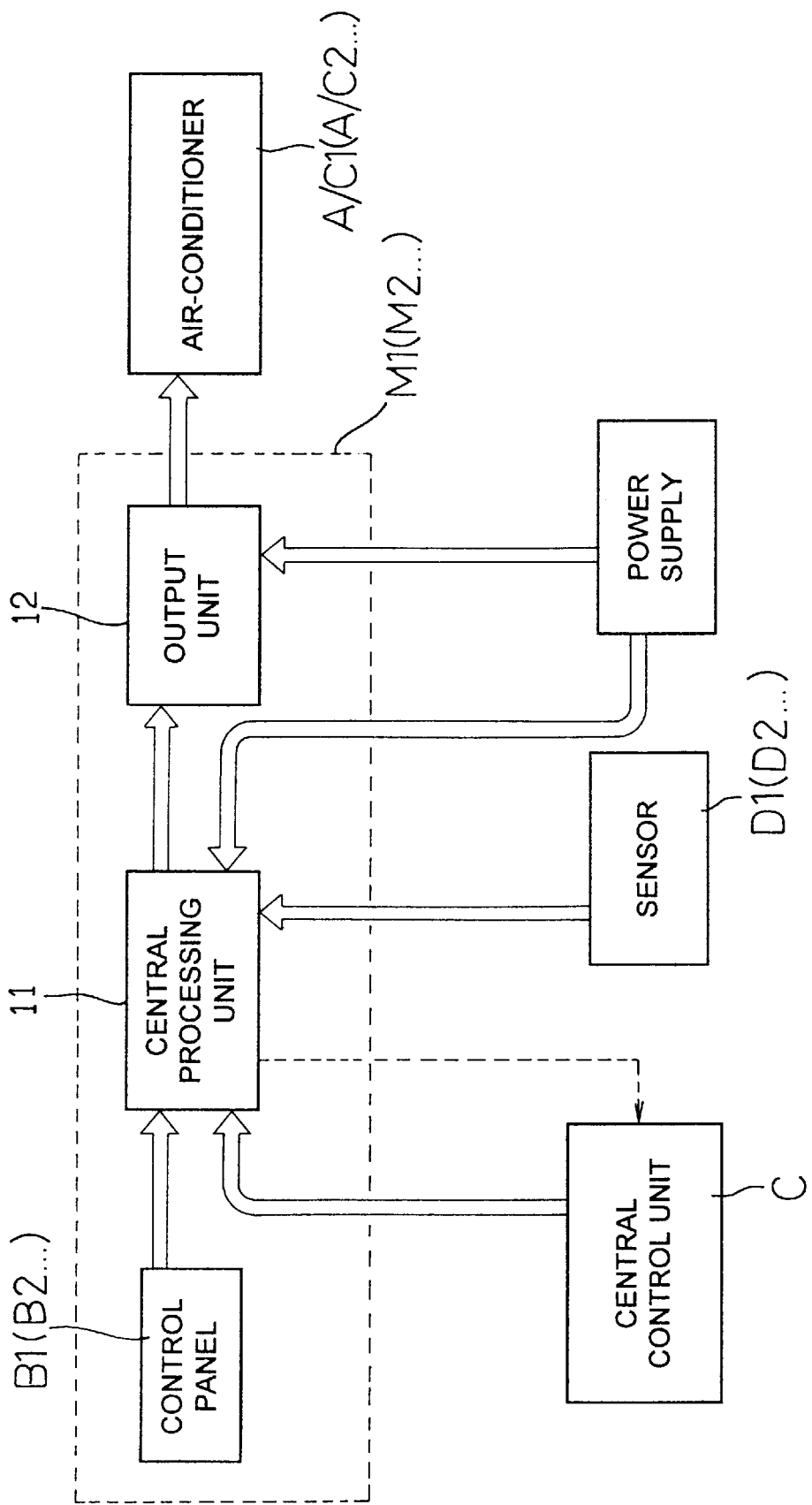
FIG. 9 is a block diagram of the control system according to the present invention.
Figure 10:
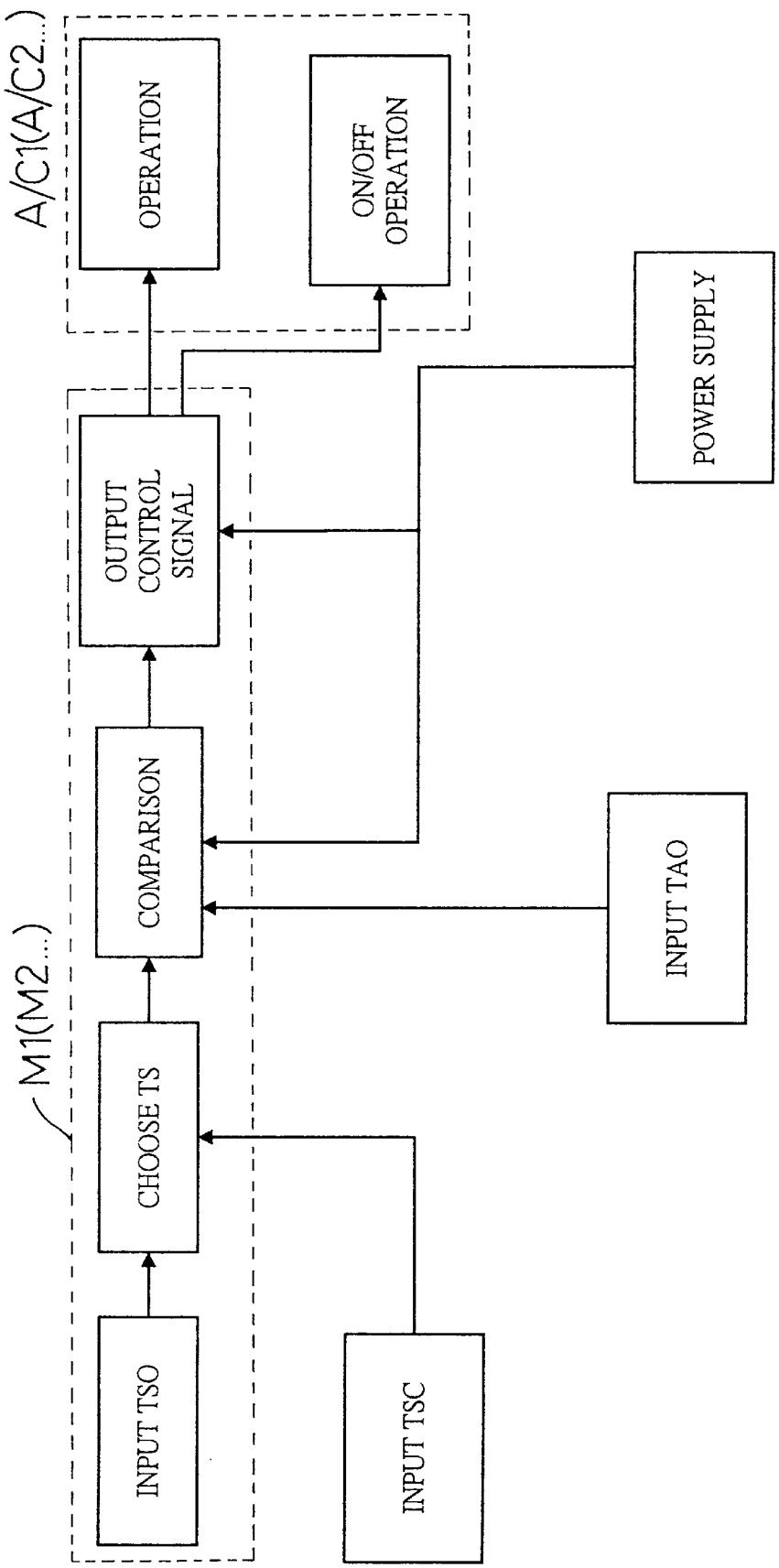
FIG. 10 is a block diagram of the control system according to the present invention.

With reference to FIGS. 9 and 10, each of the control boxes M1, M2, . . . , will choose the operation setting value TS according to the set value TS0 input by each of the control panels B1, B2, . . . , and the standard set value TSC input by the central control unit C. Then, the central processing unit 11 in each of the control boxes M1, M2, . . . , compares the sensing values TA0 detected by each of the sensors D1, D2, . . . , with the operation setting value TS, and then outputs a mating control signal from the output unit 12 so as to control the operation of each of the air-conditioners A/C1, A/C2, . . . , and to control the ON/OFF operation of each of the air-conditioners.

Figure 12:
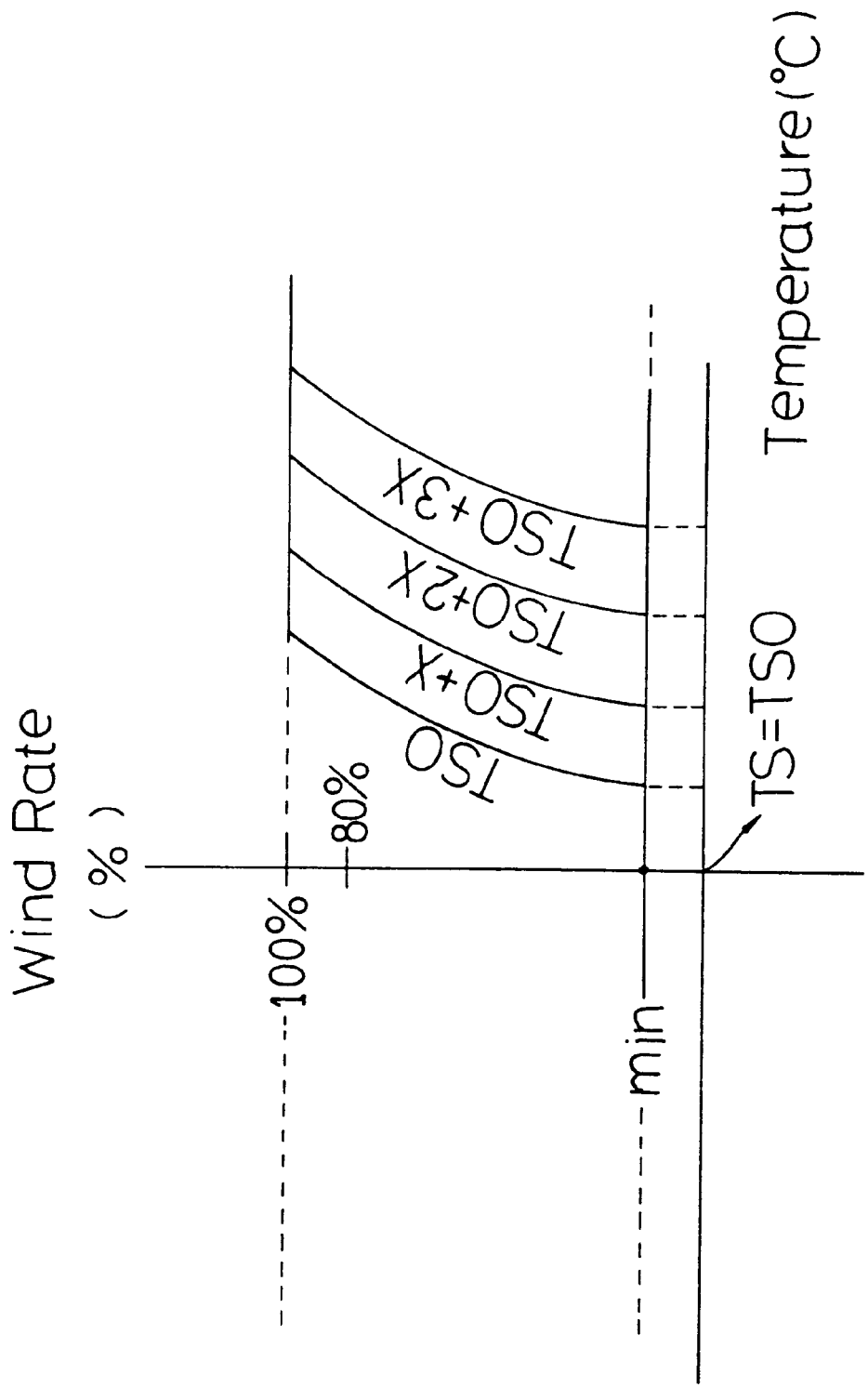
FIG. 12 is a graph of wind rate versus temperature according to the second and third embodiments of the present invention.

With reference to FIGS. 11 and 12, the control system of the present invention can be used to automatically adjust the operation setting value TS to be the comparison level of the control system according to the air-conditioning conditions and the change of load or requirements of the user. At the same time, the wind rate of each of the air-conditioners A/C1, A/C2, . . . , and the change of the temperature can be efficiently controlled. With reference to FIG. 11, according to the first embodiment of the present invention, the wind rate is changed between its minimum value (min) and its full speed (100%), and is varied with the operation setting value TS of the temperature. FIG. 12 is a graph of the temperature versus the wind rate according to the second and third embodiments of the present invention. When the value of TS is respectively equal to TS0+X, TS0+2X, TS0+3X, . . . , the wind rate will vary with the change of the temperature between its minimum value (min) and its full speed (100%). The objective of the present invention is to control the operation setting value TS or the environmental temperature value TA, TA0, . . . , and the wind rate to change between their minimum value (min) and their full speed (100%), so as to save energy and to make the user feel more comfortable.

Figure 5:
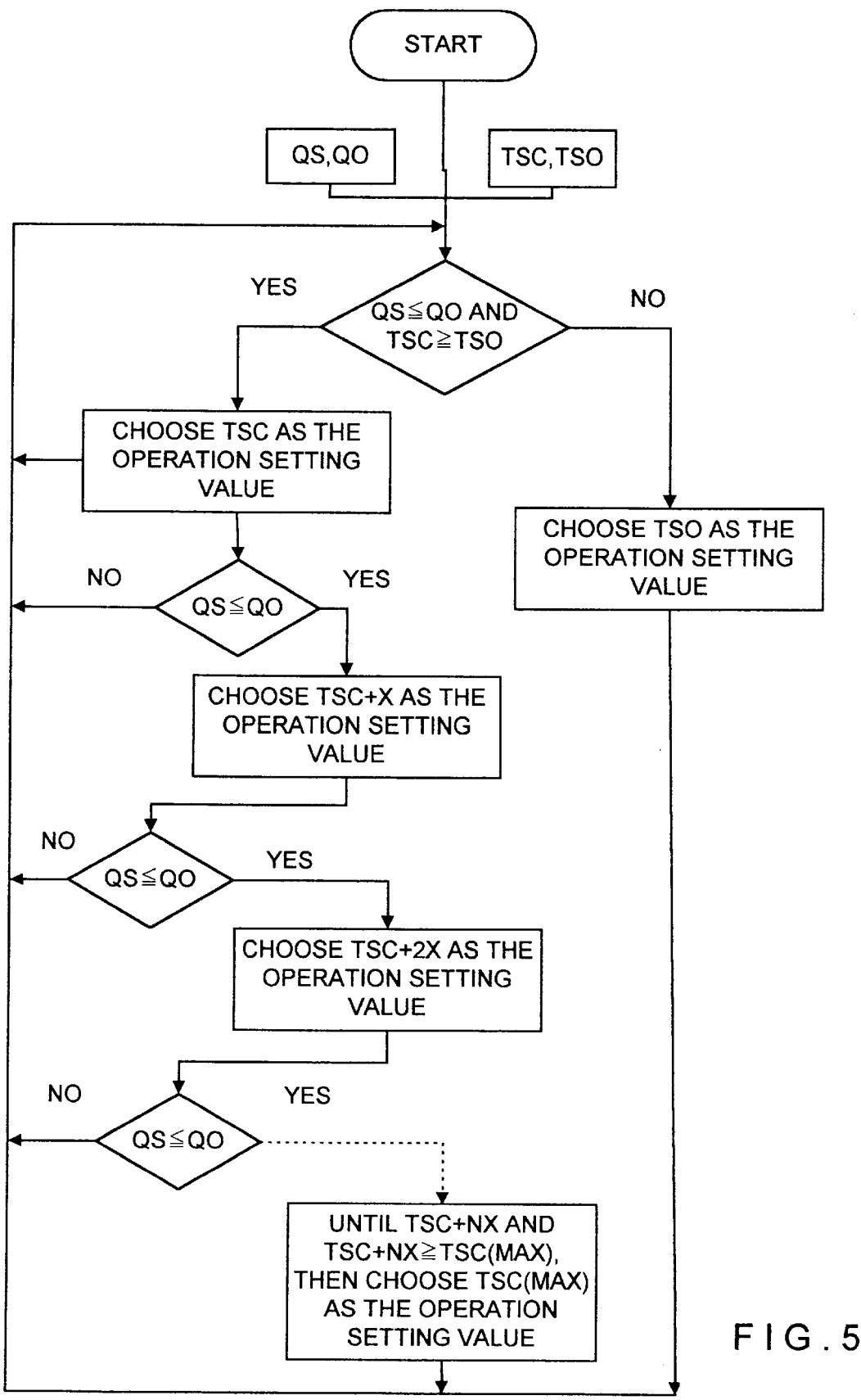
FIG. 5 is a flow chart of the control system according to a fourth embodiment of the present invention.

With reference to FIG. 5, according to a fourth embodiment of the present invention, assuming QS is a fixed amount of electricity consumption of the contract capacity of a building, and Q0 is an amount of electricity consumption of the control system.

When QS≦and Q0 TSC≧TS0, TSC is chosen as the operating setting value TS. When QS≦Q0 again, TSC+X is chosen as the operating setting value TS. When QS≦Q0 again, TSC+2X is chosen as the operating setting value TS. The above procedures are repeated until TSC+NX is chosen as the operating setting value TS, and TSC+NX≧TSC (MAX), wherein TSC(MAX) is the maximum value of TSC, then TSC(MAX) is chosen as the operating setting value TS. When TSC<TS0, TS0 is chosen as the operating setting value TS. In such a manner, TSC(MAX) is chosen as the limit of the operating setting value TS so as to prevent electric overload of the building.

Figure 6:
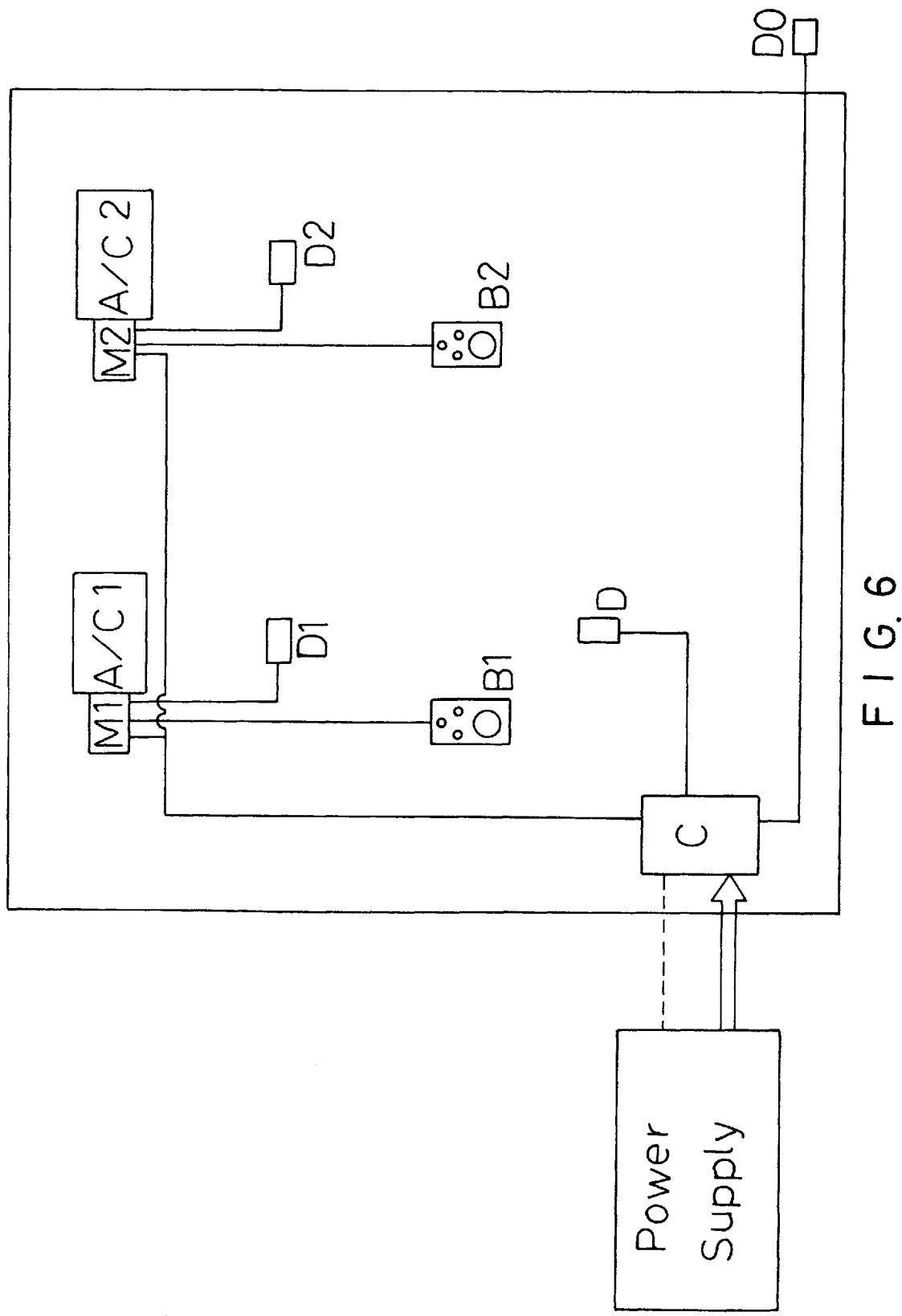
FIG. 6 is a schematic view of a foreign load management for the control system according to the present invention.

With reference to FIG. 6, the central control unit C accepts signals supplied by a foreign power supply management unit F so as to control the operation of each of the air-conditioners A/C1, A/C2, . . . , of the control system.

Figure 7:
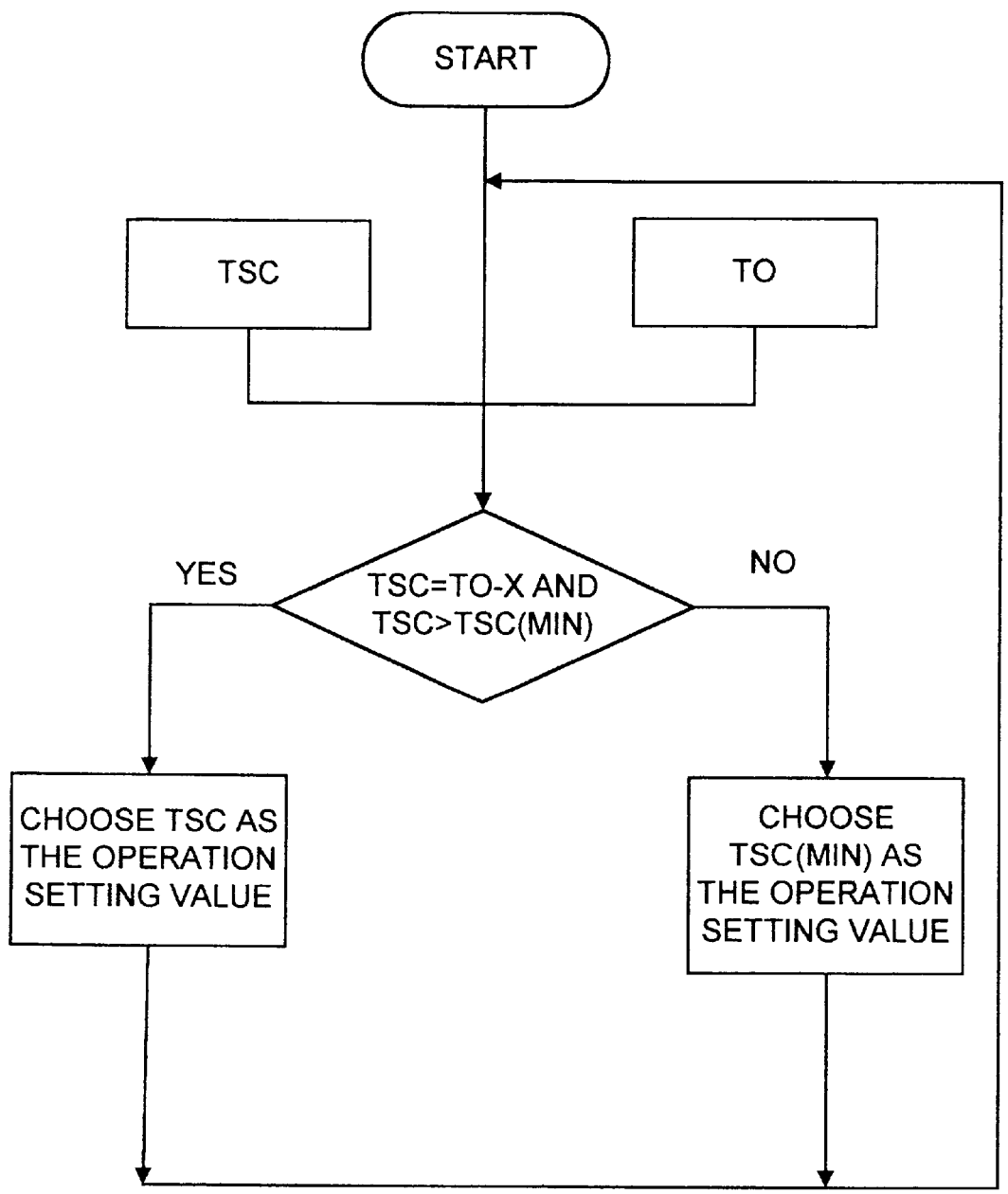
FIG. 7 is a flow chart of the control system according to a fifth embodiment of the present invention.

With reference to FIG. 7, according to a fifth embodiment of the present invention, each of the sensors D1, D2, . . . , can be used to continuously detect the ambient temperature T0, and then inputs the detected value T0 into the central control unit C. In such a manner, when TSC=T0−X, and TSC>TSC(min), wherein TSC(min) is the minimum value of TSC, TSC is chosen as the operating setting value TS, and when TSC=T0=X, and TSC≦TSC(min), TSC(min) is chosen as the operating setting value TS.

Figure 8:
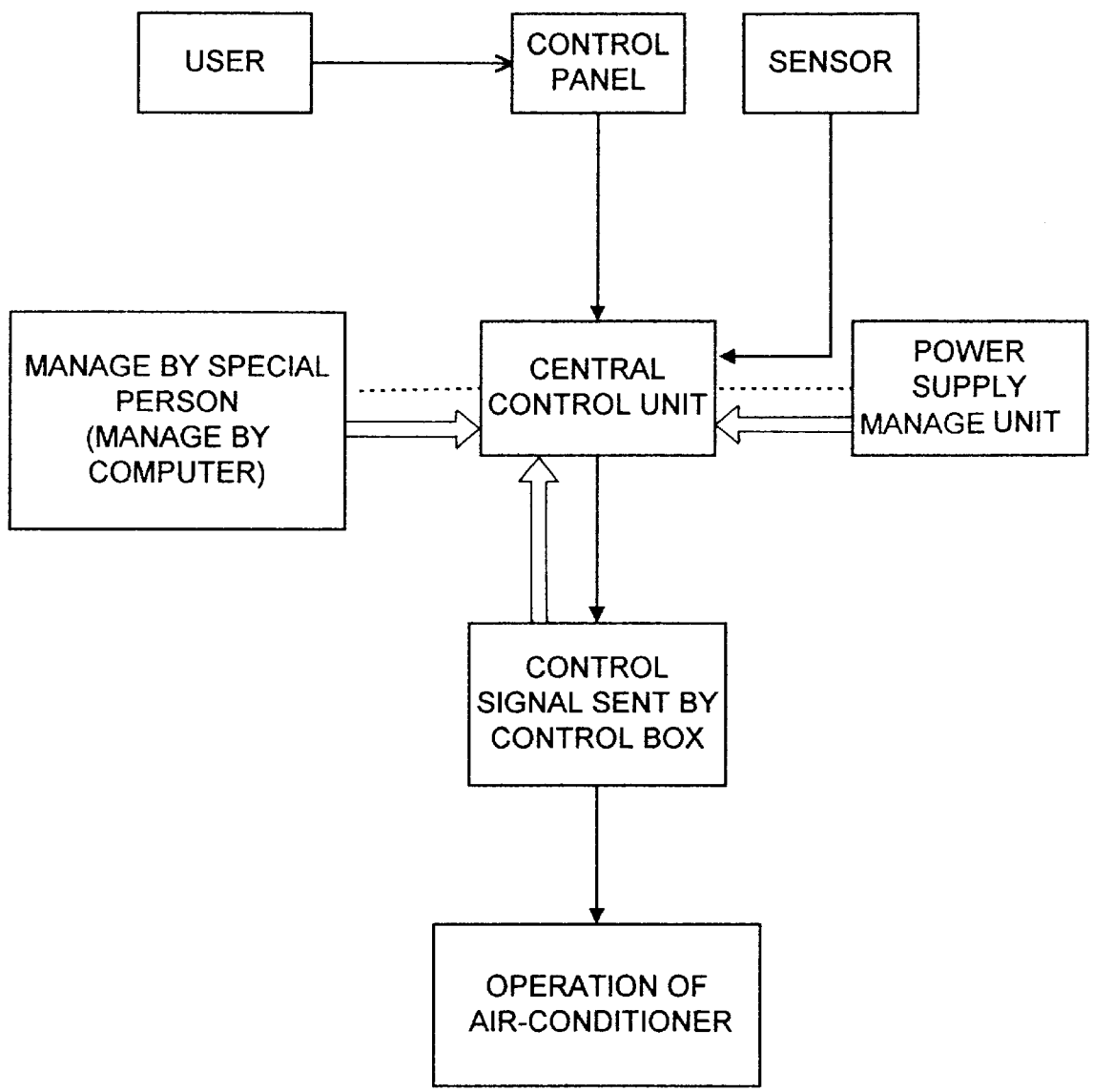
FIG. 8 is a block diagram of the control system according to the present invention.

With reference to FIG. 8, the control system of the present invention can be operated by a special person so as to achieve the purpose of saving energy, and can be connected to and managed by the computer which calculates the total electricity consumption of all of the users so as to control the operation of the air-conditioners, thereby achieving the optimal operation of the control system.

Although the present invention has been described with a certain degree of particularity, it is to be understood that the present disclose has been made by way of example only and that many other possible modifications and variations can be made without departing from the scope and spirit of the present invention.

I claim:

1. An automatic adjusting control system adapted to automatically adjust an operation setting value thereof according to the air-conditioning environmental conditions and the changes of load or the requirements of users; the control system comprising:

a plurality of air-conditioners, a plurality of sensors, input means for receiving a user-entered standard temperature set value for the control system and a user-entered temperature set value for each of the air-conditioners, at least one central processing unit operably configured to automatically generate the operation setting value for at least one of the air-conditioners responsive to a comparison of the temperature set value of the air-conditioner and the standard temperature set value of the control system; and, to compare the operation setting value with values detected by at least one sensor corresponding to the air-conditioner to produce a mating control signal therefor, and a plurality of control boxes each attached to a respective one of the air-conditioners, each of the control boxes controlling the operation of each of the air-conditioners according to the mating control signal supplied therefor generated by the central processing unit so as to adjust the air-conditioning effect and to save energy.

2. The automatic adjusting control system as claimed in claim 1, wherein when the difference between a standard temperature set value of the control system and a temperature set value of each of the air-conditioners exceeds a pre-determined value, the control system is adapted to stepwise increase the operation setting value thereof during a pre-determined interval of time, so as to moderately vary the temperature of each of the air-conditioners.

3. The automatic adjusting control system as claimed in claim 1, wherein assuming QS is a fixed amount of electricity consumption of the contract capacity of a building, and Q0 is an amount of electricity consumption of the control system, when QS≦Q0 the standard temperature set value is chosen as the operating setting value of the control system, and is output from the central control unit, thereby preventing the electricity overloading.

4. The automatic adjusting control system as claimed in claim 1, wherein the control system is adapted to control the operation thereof according to the difference between the ambient temperature and the standard temperature set value, thereby preventing the variation of temperature from changing excessively.

5. The automatic adjusting control system as claimed in claim 1, wherein the control system is connected to a computer which calculates the total electricity consumption of all of the users so as to control the operation of the air-conditioners.

6. The automatic adjusting control system as claimed in claim 1, further comprising a central control unit coupled to the central processing unit connected to signals supplied by a foreign power supply management unit which is able to drive the operation of the air-conditioners.

* * * * *